United States Patent Office 3,766,154
Patented Oct. 16, 1973

3,766,154
POLYMERIZATION PROCESS EMPLOYING MULTI-FUNCTIONAL POLYMERIZATION INITIATORS PREPARED FROM ALLYL-SUBSTITUTED TERTIARY AMINES
Floyd E. Naylor, Bartlesville, Okla., assignor to Phillips Petroleum Company, Bartlesville, Okla.
No Drawing. Original application June 9, 1969, Ser. No. 831,753, now Patent No. 3,652,456. Divided and this application Nov. 18, 1971, Ser. No. 200,176
Int. Cl. C08f 1/32, 3/06, 19/08
U.S. Cl. 260—84.7         10 Claims

ABSTRACT OF THE DISCLOSURE

Allyl-substituted tertiary amines are reacted with an organomonolithium compound to form multifunctional initiators.

This is a divisional application of U.S. application Ser. No. 831,753, filed June 9, 1969 now allowed, patented Mar. 28, 1972, as United States Letters Patent 3,652,456.

This invention relates to a new multifunctional polymerization initiator which forms as the reaction product from reacting allyl-substituted tertiary amines and organomonolithium compounds. In another aspect, it relates to a polymerization process whereby gel-free, low vinyl-containing polymers, with a reduced tendency to coldflow can be produced.

Dilithium and monolithium polymerization initiators are well known to the art. Likewise, many of these are known as compounds that present particular difficulties in preparation and storage. These known initiators often require a polar diluent for their preparation and are sufficiently unstable that they cannot be prepared and subsequently stored for very long without a loss in initiator activity. Attendant to these difficulties is the fact that the polymers prepared with their heretofore known lithium-based initiators often exhibit undesired coldflow tendencies; and block copolymers similarly prepared often exhibit low green tensile strengths.

It has now been discovered that by reacting an organomonolithium compound with an allyl-substituted tertiary amine that a surprising and versatile multifunctional polymerization initiator is produced. The conjugated diene polymers prepared with the multifunctional initiators of this invention exhibit little, if any, coldflow and are relatively free of gel. It is equally surprising that these polymers, when prepared in a hydrocarbon medium according to this present invention, possess relatively low vinyl content. Block copolymers prepared from conjugated dienes and monovinyl-substituted aromatic hydrocarbons produced according to this invention have demonstrated relatively high green tensile strength in contrast to those prepared with the monolithium initiator such as n-butyl-lithium.

It is an object of this invention to provide a new lithium-based initiator. It is an object of this invention to provide a stable initiator so as to enable easy storage thereof. It is an object of this invention to provide an improved process for the polymerization of polymerizable conjugated dienes. It is an object of this invention to provide a method whereby conjugated dienes can be polymerized in the presence of a multifunctional organolithium initiator so that the polymeric product produced thereby has a reduced tendency to coldflow. Another object of this invention is to provide an improved block copolymer possessing high Mooney viscosity values and exhibiting green tensile strength. Other objects of this invention are to produce a polymeric product which is gel-free, has a low vinyl content and possesses a reduced tendency to coldflow. Other objects, advantages, and features of my invention will be apparent to those skilled in the art from the following discussion and examples herein set forth.

According to my invention multifunctional polymerization initiators are prepared by reacting an organomonolithium compound with an allyl-substituted tertiary amine. The initiators of this invention are multifunctional in that they are branched and the branches are terminated with lithium substituents which serve as reactive sites for polymerization initiation. These multifunctional initiators contain at least two carbon-lithium bonds and when polymerizations are initiated in the presence of these compounds branched polymers are produced.

The organomonolithium compound and allyl-substituted tertiary amine can be reacted together in the presence of an inert hydrocarbon diluent which usually results in the formation of a precipitated initiator. The inert hydrocarbon diluents including paraffins, cycloparaffins, or aromatics generally containing from 4 to 10 carbon atoms per molecule are suitably employed. Examples of suitable hydrocarbons which can be used are isobutane, n-pentane, cyclohexane, benzene, toluene, and the like.

Following the reaction between the allyl-substituted tertiary amine and the organomonolithium compound the precipitated initiator thus formed can be solubilized by the addition of a solubilizing monomer such as a conjugated diene containing from 4 to 6 carbon atoms per molecule; exemplary are butadiene, isoprene, piperylene, 2,3-dimethyl-1,3-butadiene, and the like, or a monovinyl-substituted aromatic compound such as styrene and the like. Generally from about 2 to 15 moles of solubilizing monomer per mole of organomonolithium compound is sufficient to solubilize the precipitated initiator. Larger and smaller amounts can be employed.

The organomonolithium compounds that are employed according to this invention can be represented by the formula R″Li; wherein R″ is an aliphatic, cycloaliphatic, or aromatic hydrocarbon radical, or combinations thereof, preferably containing from 2 to 20 carbon atoms per molecule. Exemplary of some of these organomonolithium compounds are ethyllithium, n-propyllithium, isopropyllithium, n-butyllithium, sec-butyllithium, tert-octyllithium, n-decyllithium, n-eicosyllithium, phenyllithium, 2-naphthyllithium, 4-butylphenyllithium, 4-tolyllithium, 4-phenylbutyllithium, cyclohexyllithium, 3,5-di - n - heptyl-cyclohexyllithium, 4-cyclopentylbutyllithium, and the like. The alkyllithium compounds are preferred for employment according to this invention, especially those wherein the alkyl group contains from 3 to 10 carbon atoms.

Allyl-substituted tertiary amines employed according to this invention can be represented by one of the following general formulas:

(I)    $R_3N$ or (II)   $R_2N[(-CHR')_n-NR-]_m(CHR')_o-NR_2$ where $n$ is an integer from 1 to 6; $m$ is 0 or an integer from 1 to 6; $R'$ is hydrogen or an alkyl group containing from 1 to 3 carbon atoms; and R is an alkyl, cycloalkyl, or aryl hydrocarbon radical, or combination thereof such as cycloalkylaryl, containing from 1 to 12 carbons, or an allyl radical of the formula:

$$H_2C=CR'CR_2—$$ 

wherein $R'$ has the same meaning as hereinbefore stated and wherein said allyl-substituted tertiary amine compounds as represented by Formulas I and II contains at least two of the aforedescribed allyl groups per molecule.

Exemplary of some of these allyl-substituted tertiary amines are triallylamine;
butyldiallylamine;

tetraallylmethylenediamine;
4,7,10-triallyl-4,7,10-triaza-1,12-tridecadiene;
n-dodecyldiallylamine;
phenyldiallylamine;
(4-cyclohexylphenyl)diallylamine;
cyclopentyldiallylamine;
(3-phenylcyclohexyl)diallylamine;
tri-[2,3-dimethyl-2-(3-butenyl)]amine;
methyldi-(2-n-propylallyl)amine;
tetraallylhexamethylenediamine;
3,6-diallyl-3,6-diazaoctane;
bis-(1,48-diallylamino)-7,14,21,28,35,42-hexamethyl-7,14,21,28,35,42-hexaazaoctatetracontane;
4-phenyl-6-ethyl-9-cyclohexyl-13-methyl-18-cyclododecyl-24-(4-ethylphenyl)-31-(3-methylcyclopentyl)-4,6,9,13,18,24,31-heptaaza-1,33-tetratriacontadiene;
4,7,10-triallyl-2,3,3,11,11,12-hexamethyl-4,7,10-triaza-1,12-tridecadiene;
4,7-diphenyl-4,7-diaza-1,9-decadiene;
and the like.

The relative amounts of organomonolithium compounds and allyl-substituted tertiary amine can be expressed in terms of gram moles of organomonolithium compound per gram mole of allyl-substituted tertiary amine or in terms of gram moles of organomonolithium compound per allyl group in one mole of the allyl-substituted tertiary amine. The quantity of organomonolithium compound employed according to this invention for the preparation of these multifunctional initiators is in the range of from about 0.2 to 2, preferably from 0.5 to 1.5 moles of organomonolithium compound per each allyl group in each mole of allyl-substituted tertiary amine.

The temperatures employed for preparing the initiators of this invention can vary considerably but are generally in the range of about 25 to 100° C., preferably 50° C. or above. The organomonolithium compound and the allyl-substituted tertiary amine are reacted together generally in the range of about 1 minute to 16 hours, preferably from 10 minutes to 4 hours.

While my invention is not dependent upon any particular reaction mechanism, it is believed that both addition and metallation reactions are involved during initiator preparation. This invention makes it possible for higher functionality to be obtained than can ordinarily be achieved when preparing the multifunctional initiators.

The polymers which can be prepared by employing the initiators of this invention are homopolymers made from conjugated dienes containing from about 4 to 12, preferably 4 to 8, carbon atoms per molecule; copolymers of two or more conjugated dienes; homopolymers made from monovinyl-substituted aromatic compounds containing 8 to 20, preferably 8 to 12, carbon atoms, per molecule; copolymers of two or more monovinyl-substituted aromatic compounds; and copolymers of conjugated dienes and monovinyl-substituted aromatic compounds. Homopolymers can range from low molecular weight liquids to solid polymers. Copolymers can be random or block copolymers and this invention provides a method for obtaining rubbery block copolymers of conjugated dienes and monovinyl-substituted aromatic compounds that possess high green tensile strength. Multiple blocks of polymerized monovinyl-substituted aromatic compounds are essential to obtaining high green tensile strength. Resinous block copolymers can be prepared by polymerizing a predominant amount of monovinyl-substituted aromatic compound and a minor amount of conjugated diene.

High impact resins with a high degree of clarity and other good properties can also be prepared using the multifunctional initiators of this invention. When compounded with ingredients known in the art, the low molecular weight polymers can be used as plasticizers, caulking compounds, sealants, potting compounds, coating compounds, and the like; and the high molecular weight polymers have application in adhesive compositions, shoe soles, floor tile, tire tread, hose, belting, gaskets, and the like.

Polymerization conditions generally known to the art can be suitably employed. When using the multifunctional initiators of this invention the polymerization temperature can vary over a broad range and is generally in the range of about −70 to 150° C., and it is preferred to operate at a temperature above 30° C. It is also preferred that the polymerization be conducted in the presence of a suitable inert hydrocarbon diluent such as the paraffins, cycloparaffins, and aromatics containing about 4 to 10 carbon atoms per molecule. Exemplary of suitable diluents are benzene, toluene, xylene, cyclohexane, methylcyclohexane, n-butane, n-hexane, n-heptane, isooctane, mixtures of these, and the like.

As hereinbefore stated when a polymerization is conducted in the presence of a multifunctional initiator of this invention, the unquenched polymerization mixture has a branched structure and the branches contain terminal lithium atoms. Treatment with various agents such as carbon dioxide, epoxy compounds, and the like, yield polymers in which the functional groups of these treating agents have replaced the terminal lithium atoms on the several polymer branches. These treated polymers can be cured easily to form a tight network by reaction with various polyfunctional reagents. As an example, low molecular weight liquid polybutadiene containing multiple terminal carboxyl groups can be cured to a solid polymer with a polyfunctional aziridinyl compound or a polyfunctional epoxy compound.

The initiators of this invention are also useful for the polymerization of butadiene when present in a stream which contains appreciable amounts of compounds such as 1,2-butadiene, propadiene, acetylenes, and aldehydes.

The amount of initiator to be used in the polymerization process depends upon the particular multifunctional polymerization initiator employed and the type of polymer desired. An effective initiator level is normally in the range of about 0.25 to 100, preferably 1 to 50 milliequivalents of lithium per 100 grams of monomer (mehm.) charged to the polymerization system.

The milliequivalents of lithium can be conveniently determined by an alkalinity titration of a known volume of the reaction mixture containing the multifunctional initiator. Said alkalinity titration employs standardized acid, e.g., HCl and an indicator such as phenolphthalein to determine the end-point of titration. The alkaline normality thus obtained provides a value for the milliequivalents of lithium per milliliter of reaction mixture containing the multifunctional initiator. The alkalinity concentration (normality) first determined is then employed for charging a known quantity of milliequivalents of lithium in polymerization recipes employing the multifunctional initiators of this invention.

Illustrative of the foregoing discussion and not to be interpreted as a limitation on the materials herein employed, or on the scope of my invention, the following examples are provided.

EXAMPLE I

Multifunctional polymerization initiators were prepared from sec-butyllithium and tetraallylmethylenediamine by adding a 1 M solution of tetraallylmethylenediamine in cyclohexane and a 1.2 M solution of sec-butyllithium in cyclohexane to 15 milliliters of cyclohexane previously charged to reactor. The amounts of reactants employed were such as to give 4:1 and 5:1 mole ratio of sec-butyllithium to the amine compound. The temperature was adjusted to 70° C. for two hours while the mixtures were agitated. Each of the initiators were employed for the polymerization of butadiene according to the following recipe:

| | |
|---|---:|
| 1,3-butadiene, parts by weight | 100 |
| Cyclohexane, parts by weight | 790 |
| Initiator, mehm [1] | Variable |
| Temperature, ° C. | 50 |
| Time, hours | 20 |

[1] Mehm.=gram milliequivalents lithium per 100 grams of monomer.

Cyclohexane was charged to the reactor followed by a nitrogen purge, the butadiene, and the initiator respectively. At the conclusion of each polymerization a 10 weight percent solution of the antioxidant, 2,2'-methylene-bis(4-methyl-6-tert-butylphenol), in a mixture of equal parts by volume of toluene and isopropyl alcohol, was added in an amount sufficient to provide one part by weight of the antioxidant per 100 parts by weight of the polymer. The polymer was coagulated in isopropyl alcohol then separated and dried. The results of the polymerization are presented in Table I.

The above results effectively demonstrate that the multifunctional initiators of this invention produce polybutadiene possessing reduced coldflow tendencies when compared to polybutadiene produced when employing the n-butyllithium initiator.

EXAMPLE III

Initiators were prepared by reacting variable quantities of a 1.25 molar solution of sec-butyllithium in cyclohexane with a 1.0 molar solution of tetraallylmethylenediamine for one hour at 70° C. while the mixtures were

TABLE I

| Run No. | Initiator Mole ratio BuLi:amine | Meq. | Conversion, percent | Cold flow,[1] mg./min. | Inherent viscosity[2] | Gel, percent | ML-4 at 212° F.[3] | Microstructure percent[4] Cis | Trans | Vinyl |
|---|---|---|---|---|---|---|---|---|---|---|
| 1 | *4:1 | 5 | 100 | 0 | 3.09 | 0 | 116 | (5) | | |
| 2 | *4:1 | 6 | 100 | 0 | 2.74 | 0 | 90 | (5) | | |
| 3 | 4:1 | 4 | 100 | 0 | 3.19 | 0 | 117 | 46.1 | 46.4 | 7.5 |
| 4 | 5:1 | 4 | 100 | 0 | 3.11 | 0 | 129 | 45.0 | 47.6 | 7.4 |

[1] As described in U.S. Patent 3,218,306, column 6, lines 61–66.
[2] Determined as described in U.S. Patent 3,215,679, notes (B) and (C), column 11.
[3] ASTM-D-1646-63.
[4] Determined as described in U.S. Patent 3,215,679, note (K), column 12.
[5] Not determined.
*Initiator stored at room temperature (about 25° C.) for 48 hours prior to use without agitation.

The above data demonstrate that high molecular weight, gel-free polymers with little, if any, coldflow were obtained by employing the initiators of this invention. The data from Runs 1 and 2 also show that these initiators have a desirable degree of stability on storage. These results further indicate that branched polymers were obtained from polymerizations initiated in the presence of my multifunctional initiators. At the initiator levels employed in the above example use of the butyllithium initiators of the prior art would have resulted in liquid polymers.

EXAMPLE II

An initiator was prepared employing three millimoles of sec-butyllithium per one millimole of triallylamine by reaction thereof at 70° C. for 3 hours in sufficient cyclohexane to produce a 1 N solution in alkyllithium. The multifunctional initiator thus prepared and n-butyllithium, employed as a control, were separately employed for the polymerization of 1,3-butadiene according to the following polymerization recipe:

| | |
|---|---|
| 1,3-butadiene, parts by weight | 100 |
| Cyclohexane, parts by weight | 790 |
| Initiator | Variable |
| Temperature, ° C. | Variable |
| Time, hours | Variable |
| Conversion, percent | 100 |

The cyclohexane was charged to the reactor, followed by nitrogen purge, the addition of the butadiene and initiator, respectively. The reaction conditions and results are reported in Table II.

TABLE II

| Run No. | Temp., ° C. | Time, hours | Initiator | Cold flow, mg./min. | ML-4 at 212° F |
|---|---|---|---|---|---|
| 1 | 70 | 1.75 | (a) 5.0 mehm[1] | 0.0 | 129 |
| 2 | 70 | 1.75 | (a) 6.0 mehm.[1] | 0.0 | 85 |
| 3 | 70 | 1.75 | (a) 7.0 mehm.[1] | 0.0 | 66 |
| 4 | 70 | 1.75 | (a) 8.0 mehm.[1] | 0.0 | 49 |
| 5 | 50 | 5.5 | (b) 0.90 mhm.[2] | 6.0 | 128 |
| 6 | 50 | 5.5 | (b) 0.95 mhm.[2] | 9.0 | 100 |
| 7 | 50 | 5.5 | (b) 1.00 mhm.[2] | 13 | 78 |
| 8 | 50 | 5.5 | (b) 1.05 mhm.[2] | 15 | 58 |
| 9 | 50 | 5.5 | (b) 1.10 mhm.[2] | 22 | 51 |
| 10 | 50 | 5.5 | (b) 1.15 mhm.[2] | 48 | 29 |

[1] mehm=gram milliequivalents lithium per 100 grams of monomer.
[2] mhm.=millimoles n-butyllithium per 100 grams of monomer.

NOTE.—(a)=Multifunctional initiator. (b)=n-Butyllithium initiator, control.

agitated. These initiators were employed for the polymerization of butadiene using the following recipe:

| | |
|---|---|
| 1,3-butadiene, parts by weight | 100 |
| Cyclohexane, parts by weight | 740 |
| Initiator, mehm. | 25 |
| Temperature, ° C. | 50 |
| Time, hours | 3.5 |

Cyclohexane and butadiene were charged to each initiator in the reactor in which said initiator was prepared. At the conclusion of each polymerization a four-fold excess of propylene oxide was added to shortstop the reaction. After about 16 hours the polymers were recovered by adding the antioxidant solution and isopropyl alcohol as in Example I. Quantitative monomer conversion was obtained in each case. The polymers were liquids. Table II shows the results of microstructure and hydroxy determinations.

TABLE III

| Run No. | Initiator, mole ratio BuLi : amine | Hydroxy content, percent | Microstructure, percent Cis | Trans | Vinyl |
|---|---|---|---|---|---|
| 1 | 3:1 | 0.48 | 42.3 | 49.2 | 8.5 |
| 2 | 4:1 | 0.82 | (1) | (1) | (1) |

[1] Not determined.

These data show that liquid low-vinyl containing polymers with terminal hydroxy groups can be obtained when using the initiators of this invention.

EXAMPLE IV

Initiators were prepared from tetraallylmethylenediamine and triallylamine by reacting sec-butyllithium with each amine. The initiator from tetraallylmethylenediamine was prepared as described in Example III using a 6:1 mole ratio of butyllithium to amine compound. The other initiator was prepared by reacting a 1.0 molar solution of triallylamine in cyclohexane with a 1.49 molar solution of sec-butyllithium in cyclohexane in amounts such that the mole ratio of butyllithium to triallylamine was 3:1. The reactants were agitated for 3 hours at 70° C.

These initiators were employed for the preparation of multiblock copolymers of btuadiene and styrene. The recipes were as follows:

|  | A | B |
|---|---|---|
| 1,3-butadiene, parts by weight | 50 | 60 |
| Styrene, parts by weight | 50 | 40 |
| Cyclohexane, parts by weight | 790 | 790 |
| Initiator, mehm | 8 | Variable |
| Temperature, °C | 50 | 50 |
| Time, hours | 18 | 18 |
| Conversion, percent | 100 | 100 |

Cyclohexane was charged to the reactor first followed by a nitrogen purge. The styrene, butadiene, and initiator were added in that order respectively. Green tensile strength, elongation, and polystyrene content were determined for each of the polymers produced and the data are presented in Table IV.

TABLE IV

| Run No. | Recipe | Initiator From— | Mehm | Tensile,[1] p.s.i. | Elongation,[1] percent | Polystyrene,[2] percent |
|---|---|---|---|---|---|---|
| 1 | A | Tetraallylmethylenediamine | 8 | 1,600 | 530 | 38.3 |
| 2 | B | Triallylamine | 4 | 1,100 | 1,100 | 27.7 |
| 3 | B | do | 6 | 1,450 | 2,070 | 28.5 |
| 4 | B | do | 8 | 2,000 | 1,700 | 28.4 |

[1] Determined by ASTM-D-412-62T.
[2] Determined by the oxidative degradation procedure of I. M. Kolthoff et al., J. Polymer Sci., 1, 429 (1946).

The results of the polystyrene determinations demonstrate that multiblock copolymers were produced. The products had high green tensile strength which is also indicative of the type of block copolymer obtained. 1,3-butadiene/styrene block copolymers in which one end of the polymer is a polybutadiene segment and the other end is a polystyrene segment have green tensile strengths that are too low to measure on the Instron Tensile machine.

EXAMPLE V

An initiator was prepared by reacting sec-butyllithium with triallylamine according to the following recipe:

sec-Butyllithium, mmoles _____ 60
Triallylamine, mmoles _____ 20
Cyclohexane, sufficient to give a 1.0 molar concentration with respect to sec-butyllithium.
Temperature, °C. _____ 70
Time, minutes _____ 45

The above-prepared initiator designated initiator A, was employed for the random copolymerization of butadiene with styrene. A control run employing n-butyllithium designated initiator B, was similarly employed. The following polymerization recipe was used:

POLYMERIZATION RECIPE

|  | 1 | 2 |
|---|---|---|
| 1,3-Butadiene, parts by weight | 75 | 75 |
| Styrene, parts by weight | 25 | 25 |
| Tetrahydrofuran, parts by weight | 1.5 | 1.5 |
| Cyclohexane, parts by weight | 1.000 | 790 |
| Initiator A, mehm |  | 5 |
| Initiator B, mehm | 1.15 |  |
| Temperature, °C | 50 | 70 |
| Time, minutes | 180 | 90 |
| Conversions, percent | 100 | 100 |

Cyclohexane was charged to the reactor followed by a nitrogen purge. Butadiene was added followed by the styrene, tetrahydrofuran and initiator respectively. The results of the polymerization are presented in Table V. Run 1 represents the n-butyllithium initiator and Run 2 the initiators of this invention.

TABLE V.—RAW RUBBER PROPERTIES

|  | Run 1 | Run 2 |
|---|---|---|
| ML-4 at 212° F | 44 | 65 |
| Microstructure, percent | ([1]) |  |
| Cis | ([1]) | 29.8 |
| Trans | ([1]) | 42.0 |
| Vinyl | ([1]) | 28.2 |
| Styrene, percent | ([1]) | 24.8 |
| Polysytrene, percent | ([1]) | 0 |
| Inherent viscosity | 1.77 | 1.9 |
| Gel, percent | 0 | 0 |
| Cold flow, mg./min | 4.3 | 0 |

This example demonstrates that those polymers prepared with the initiators of this invention have physical properties comparable to the control but possessing significantly lower coldflow. This coldflow differential indicates that the polymers produced according to this invention are branched which in turn reflects the multifunctional nature of the initiators of this invention.

The polymers produced with each initiator were evaluated in a treadstock recipe as follows:

COMPOUNDING RECIPE, Parts by Weight

Rubber _____ 100
High abrasion furnace black _____ 50
Zinc oxide _____ 3
Stearic acid _____ 2
Flexamine*[1] _____ 1
Aromatic oil (Philrich 5*) _____ 10
Sulfur _____ 1.75
N-cyclohexyl-2-benzothiazolesulfenamide ____ 1.2

[1] Physical mixture containing 65 percent of a complex diarylamine-ketone reaction product and 35 percent of N,N'-diphenyl-p-phenylenediamine.

*Trademark.

TABLE VI.—PHYSICAL PROPERTIES, CURED 30 MINUTES AT 307° F.

|  | Run 1 | Run 2 |
|---|---|---|
| 300% modulus, p.s.i | 1,530 | 1,455 |
| Tensile, p.s.i | 2,970 | 3,380 |
| Elongation, percent | 490 | 540 |
| Max. tensile at 200° F., p.s.i | ([1]) | 1,195 |
| Tear strength at 200° C., lb./in | ([1]) | 130 |
| ΔT, ° F | 53 | 59.6 |
| Resilience, percent | 66 | 66.0 |
| Shore A hardness | ([1]) | 57.5 |

[1] Not determined.

The data show that random copolymers with good vulcanizate properties were obtained using the initiators of this invention.

EXAMPLE VI

The preparation of the multilithium initiators of this invention and gas-liquid chromatography, analysis of the reaction of sec-butyllithium with triallylamines is demonstrated in this example.

The reaction of triallylamine (3 gram millimoles) with sec-butyllithium (9 gram millimoles) was examined by gas-liquid chromatography (GLC) analysis. In this run isobutane (1 gram millimole) was added to the reaction mixture as an internal standard and gas phase samples (500 microliter) were withdrawn at various times and analyzed by GLC to follow the disappearance of the sec-butyllithium. GLC analyses were performed with a Perkin-Elmer Model 154 Vapor Fractometer. Analyses were made at 25° C. with helium (25 p.s.i.g.) as carrier gas. The chromatography column was 16 feet, ¼ inch OD copper tubing packed with a support of crushed firebrick (Chromasorb P obtained from Johns-Manville Co.) containing 17 weight percent hexamethylphosphoramide. The results of these analyses are shown in the table below.

| | n-Butane, gram millimoles found after— | | | |
|---|---|---|---|---|
| Mixing [a] | 1 hr. at 70° C.[b] | Hydrolysis [c] | sec-BuLi consumed [d] |
| 0.53 | 2.03 | 2.05 | 6.95 |

[a] Analysis made immediately after reactants were mixed. The amount found represents the destruction of sec-butyllithium by rapid reacting impurities or other fast reactions.
[b] Analysis made after 1 hour at 70° C. The amount found represents destruction of sec-butyllithium by slow reacting impurities or metallation of triallylamine or other slow reaction.
[c] Analysis made after reaction mixture was hydrolyzed with sufficient water to completely react with all the sec-butyllithium initially charged. The amount found indicates only 0.02 millimoles of sec-butyllithium was unreacted at this time.
[d] This amount consumed by reaction with triallylamine was determined by the difference between the amount of sec-butyllithium charged (9 millimoles) and the amount of n-butane found after hydrolysis (2.05 millimoles).

The above results demonstrate that at least 6.95 millimoles of sec-butyllithium were consumed by reaction with 3 millimoles of triallylamine. These results further inndicate that for each mole of reacted triallylamine there is attached thereto an average of at least 2.31 lithiums which furher demonstrates the multifunctional nature of the initiators of this invention.

As will be evident to those skilled in the art, various modifications of this invention can be made or followed, in light of the disclosure and discussion herein set forth, without departing from the scope and spirit thereof.

I claim:
1. A polymerization process which comprises contacting under polymerization conditions a multifunctional polymerization initiator with a polymerizable monomer which is a conjugated diene, polymerizable monovinyl-substituted aromatic compound, or two or more of either, or mixtures thereof, wherein said multifunctional polymerization initiator is that which forms by steps comprising admixing components comprising an allyl-substituted tertiary amine and an organomonolithium compound wherein about 0.2 to 2 moles of said organomonolithium compound is provided per each allyl group in each mole of said allyl-substituted tertiary amine, and thereafter contacting said multifunctional polymerization initiator so-formed with said polymerizable monomer, wherein said allyl-substituted tertiary amine is represented by

(I)                     $R_3N$ or (II)    $R_2N[(-CHR')_n-NR-]_m-(CHR')_n-NR_2$ wherein $n$ is an integer from 1 to 6, $m$ is 0 or an integer from 1 to 6, R' is hydrogen or an alkyl group containing from 1 to 3 carbon atoms, and R is a hydrocarbon radical containing from 1 to 12 carbon atoms and is alkyl, cycloalkyl, aryl, a combination thereof, or an allyl radical $H_2C=CR'_2-$ such that said allyl-substituted tertiary amine as represented by said (I) and (II) contains at least two allyl radicals per molecule.

2. The process of claim 1 weherin said multifunctional polymerization initiator is employed in an amount sufficient to provide in the range of about 0.25 to 100 milliequivalent of lithium per 100 grams of monomer charged to the polymerization system.

3. The process of claim 2 wherein said polymerizable conjugated diene is copolymerized with polymerizable monovinyl-substituted aromatic compound, and wherein the concentration of said initiator is in the range of about 1 to 50 milliequivalents of lithium per 100 grams of monomer charged to the polymerization system.

4. The process of claim 2 wherein said polymerizable conjugated diene is 1,3-butadiene and said polymerizable monovinyl-substituted aromatic compound is styrene, and wherein said process is conducted in the presence of a hydrocarbon diluent.

5. The process of ulaim 4 wherein said initiator is contacted with a mixture of 1,3-butadiene and styrene in the presence of a hydrocarbon diluent.

6. The process of claim 1 wherein said organomonolithium compound is R″Li wherein R″ is a hydrocarbyl radical containing from 2 to 20 carbon atoms and is aliphatic, cycloaliphatic, aromatic or a combination thereof.

7. The polymerization process according to claim 6 wherein said contacting is at a temperature in the range of about −70 to 100° C.; said admixing of components is conducted in the presence of an inert hydrocarbon diluent; and said components are allowed to react in the range of about one minute to sixteen hours.

8. The process of claim 7 wherein said admixing of components is conducted at a temperature of 50° C. or above, said components are allowed to react in the range of about 10 minutes to 4 hours.

9. The process of claim 6 wherein said organomonolithium compound is sec-butyllithium and said allyl-substituted tertiary amine is tetraallylmethylenediamine or triallylamine.

10. The process of claim 6 further including the step of adding a solubilizing monomer to the reaction product of said organomonolithium compound and said allyl-substituted tertiary amine, wherein said solubilizing monomer is a monovinyl-substituted aromatic compound, a conjugated diene, or mixture thereof, and about 2 to 15 moles of said solubilizing monomer are provided per mole of said organomonolithium compound.

References Cited
UNITED STATES PATENTS

| | | | |
|---|---|---|---|
| 3,451,988 | 6/1969 | Langer, Jr. | 260—94.6 |
| 3,652,456 | 3/1972 | Naylor | 260—94.6 |
| 3,658,776 | 4/1972 | Naylor | 260—94.6 |

JAMES A. SEIDLECK, Primary Examiner

U.S. Cl. X.R.
260—93.5 S, 94.6